United States Patent [19]

Johnson

[11] Patent Number: 4,607,424

[45] Date of Patent: Aug. 26, 1986

[54] THERMAL REGENERATOR

[75] Inventor: Alfred L. Johnson, Manhattan Beach, Calif.

[73] Assignee: The United States of America as represented by the Secretary of the Air Force, Washington, D.C.

[21] Appl. No.: 710,840

[22] Filed: Mar. 12, 1985

[51] Int. Cl.[4] .................. B23P 15/26; B23P 17/00
[52] U.S. Cl. .................. 29/157.3 R; 29/423; 165/4
[58] Field of Search .......... 165/4, 10; 60/526; 29/157.3 R, 423

[56] References Cited

U.S. PATENT DOCUMENTS

| 2,552,937 | 5/1951  | Cohen.       |         |
|-----------|---------|--------------|---------|
| 2,958,935 | 11/1960 | Bloem        | 165/10  |
| 3,413,802 | 12/1968 | Cowans       | 60/526  |
| 3,477,496 | 11/1969 | Becker       | 165/10  |
| 3,789,494 | 2/1974  | Bostrom et al. | 29/423 |

FOREIGN PATENT DOCUMENTS

| 138925  | 10/1950 | Australia | 29/157.3 R |
| 1294514 | 4/1962  | France    | 165/10     |
| 151677  | 9/1955  | Sweden    | 165/10     |

Primary Examiner—Albert W. Davis, Jr.
Attorney, Agent, or Firm—Donald J. Singer; Charles E. Bricker

[57] ABSTRACT

A regenerative-type thermal-storage heat exchanger having a thermal regenerator matrix formed by a plurality of radially spaced coaxial coils of solid cross-section thermal material surrounding a core. The matrix is formed from woven structures, each structure consisting of a plurality of longitudinal thermal members, a plurality of transverse cords woven through the thermal members and means for maintaining the thermal members in alignment during fabrication of the matrix. The matrix is formed by spirally winding the woven structure around a mandrel. After winding, the wound structure is inserted in a regenerator housing and the alignment maintaining means is then removed.

5 Claims, 12 Drawing Figures

THERMAL REGENERATOR

RIGHTS OF THE GOVERNMENT

The invention described herein may be manufactured and used by or for the Government of the United States for all governmental purposes without the payment of any royalty.

BACKGROUND OF THE INVENTION

The present invention relates to improvements in heat exchangers of the regenerator type. In one aspect the invention relates to an improved thermal regenerator. In another aspect the invention relates to a method for constructing a thermal regenerator matrix.

A thermal regenerator is a combined thermal energy storage/supply convective heat transfer device which aids in establishing and maintaining a temperature difference in a working fluid between two regions in a thermodynamics machine. In a thermal regenerator, a solid material, hereinafter referred to as a matrix, is successively subjected to the influence of fluids at different temperatures, absorbing heat from a hotter fluid and subsequently imparting heat to a cooler fluid. Design of the thermal storage matrix is critical to the operation of a regenerator.

The desirable features of a thermal storage matrix include the following:

1. Large surface area per unit volume.
2. High thermal energy storage capacity per unit volume.
3. Low thermal conductivity in the direction of fluid flow.
4. Low fluid space (void space) per unit volume.
5. Low pressure drop per unit heat transfer.
6. Physically stable; chemically inert.

Media selected for the thermal storage matrix have included the following:

A. Small, closely packed sphere matrix, generally one diameter.
B. Wire screen matrix, generally randomly stacked.
C. "Corrugated" ceramic core, as described by Cohen, U.S. Pat. No. 2,552,937.
D. Reticulated open cell ceramic foam.

Media A and B possess features 1, 2 and 3; however, they exhibit high pressure drop per unit heat transfer. Media C and D possess features 1, 2 and 5; however, they do not have features 3 and 4. What is desired is a matrix media having all the features described above.

It is an object of the present invention to provide a method for fabricating an improved thermal regenerator matrix.

It is another object of the present invention to provide an improved thermal regenerator.

Other objects, advantages and aspects of the present invention will be apparent to those skilled in the art.

SUMMARY OF THE INVENTION

In accordance with the present invention there is provided a method for fabricating a thermal regenerator matrix which comprises the steps of:

(a) Providing a composite woven structure consisting of a plurality of parallel, longitudinally oriented, spaced apart thermal members for storage and transfer of heat, a plurality of parallel, transversely oriented, spaced apart spacing members woven through the thermal members, and removable means for maintaining the thermal members in parallel relation;

(b) Winding the composite structure spirally around a cylindrical mandrel to provide a wound matrix structure;

(c) Disposing the wound structure in a regenerator housing comprising an outer wall, a central cylindrical core having closed ends, a first end closure means, a second end closure means, a first fluid transfer means in operable communication with the first end closure means and a second fluid transfer means in operable communication with the second end closure means, whereby a fluid may be transferred from one of the fluid transfer means through the matrix disposed in the housing to the other of the fluid transfer means; and, (d) removing the maintaining means.

Also provided in accordance with the present invention is a thermal regenerator having a heat-storage mass or matrix consisting essentially of a plurality of coaxial, radially spaced coils spaced apart and maintained in parallel relation by a plurality of spacer members woven through the coils.

DETAILED DESCRIPTION OF THE INVENTION

Figure 1:
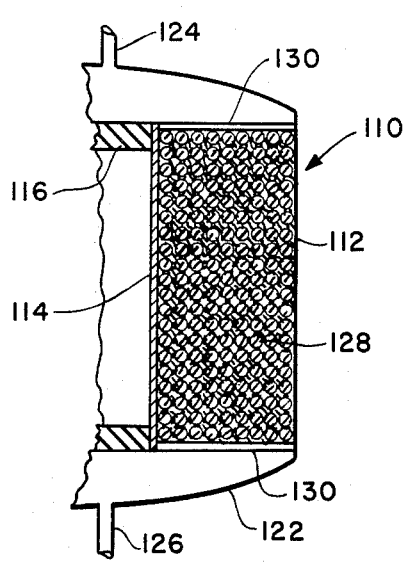
FIG. 1 is a half axial cross-sectional view of a thermal regenerator in accordance with the invention.
Figure 8:
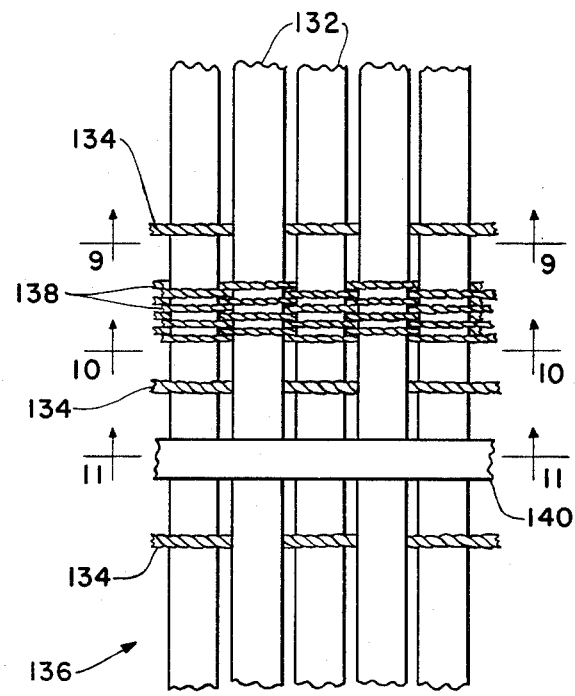
FIG. 8 is a top view of a portion of the woven material used to form the matrix.

Referring to the drawings, FIG. 1 illustrates a thermal regenerator 110 which comprises an outer wall 112, a cylindrical core 114 having closed ends 116 and 118, a first end closure 120, a second end closure 122, a first fluid transfer means or conduit 124 and a second fluid transfer means or conduit 126 for supplying fluid to or removing fluid from the interior of the regenerator 110, a heat-storage-mass 128, and means 130 for supporting and maintaining the mass 128 in a desired position. The support means 130 may comprise wire screen, a perforated disk or the like.

Figure 2:
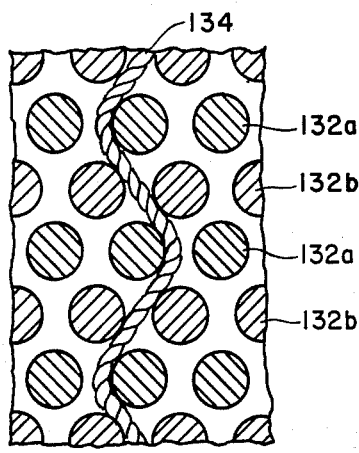
FIG. 2 is an enlarged cross-sectional view of a portion of the matrix.

Referring now to FIG. 2, the heat-storage-mass 128 comprises a plurality of spaced-apart thermal members 132 and a plurality of spacer members 134, although only one such member 134 is shown.

Figure 9:
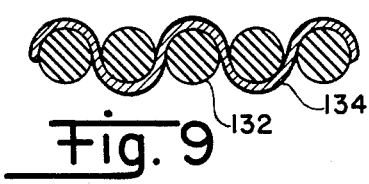
FIG. 9 is a cross-section through 9—9 of FIG. 8.
Figure 10:
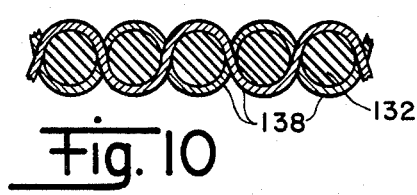
FIG. 10 is a cross-section through 10—10 of FIG. 8.
Figure 11:
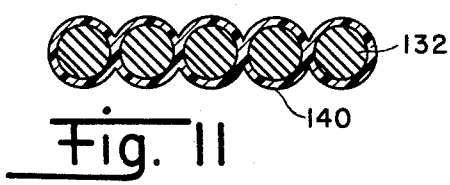
FIG. 11 is a cross-section through 11—11 of FIG. 8.

Referring to FIGS. 8-12, the heat-storage-mass 128 is fabricated by first providing a composite woven structure 136 consisting of a plurality of spaced apart, longitudinally oriented, parallel thermal members 132, a plurality of parallel, transversely oriented, spaced apart spacer members 134 woven through the thermal members 132, as shown in FIG. 9, and means for maintaining the thermal members 132 in parallel relation during later fabrication steps. The maintaining means may consist of a plurality of transversely oriented threads 138 woven through the thermal members 132, as shown in FIG. 10, or a polymeric mass 140 applied to one or both sides of the thermal member matrix, as shown in FIG. 11.

Figure 3:
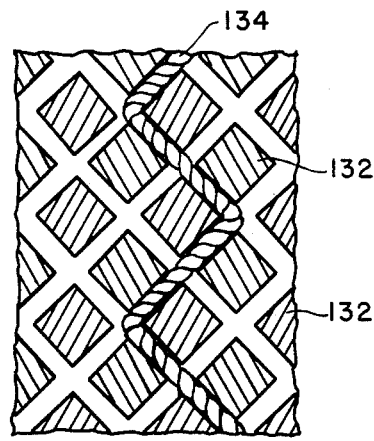
FIGS. 3-7 are cross-sectional views of other embodiments of the matrix.
Figure 4:
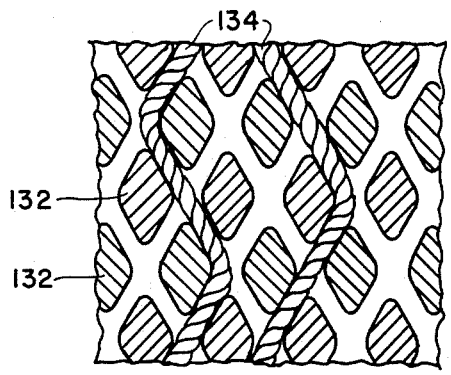
Figure 5:
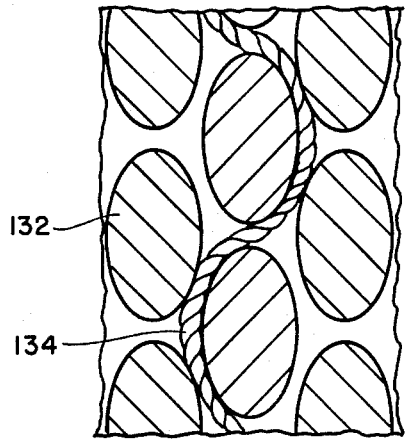
Figure 6:
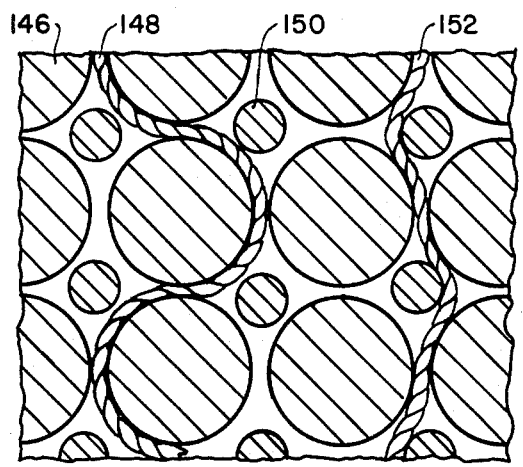
Figure 7:
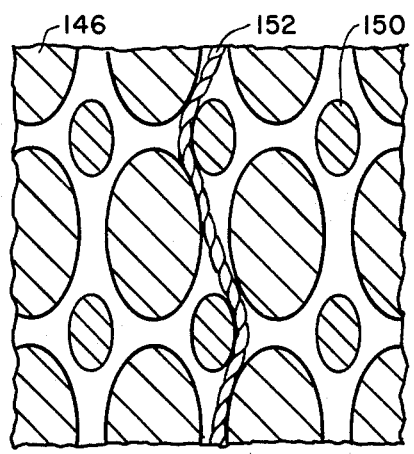

The thermal members 132 are wires having any desired cross-section. The members 132 may be round, as shown in FIGS. 2 and 6, square, as shown in FIG. 3, diamond-shaped, as shown in FIG. 4, or elliptical, as shown in FIGS. 5 and 7.

The thermal members 132 may have a maximum cross-sectional dimension in the approximate range of 0.05 to 25 mm. The elliptical or diamond-shaped members may have an aspect ratio of major axis:minor axis of up to about 5:1.

The thermal members 132 may be made of any material having the desired combination of corrosion resistance in the working environment, formability, heat capacity and the like. Suitable materials include metals, ceramics, semiconductors, glasses, and the like, which can be formed into the desired cross-section.

The spacer members 134 should be capable of withstanding temperatures throughout the manufacturing and operating range without change in state and should be chemically inert to the working environment. Suitable spacer members include wire, continuous fiber and cord fabricated from glass, ceramics, carbon, metal and the like, including materials coated with a thin surface layer of other material which imparts the desired heat resistance and/or chemical inertness to the cord. As one example, braided wire cord may be galvanized with zinc to render it corrosion-resistant. Alternatively, the spacer members 134 may be composed of a material having inherently good corrosion resistance, e.g., aluminum wire. As used herein, and in the claims, the term "cord" is intended to have its ordinary meaning, i.e., a string or thin rope made of several strands or threads braided, twisted or woven together. The spacer members 134 may have a maximum cross-sectional dimension of about 0.03 to 5.0 mm.

The composite structure 136 is woven with the thermal members 132 oriented longitudinally in the warp direction. The heat-resisting spacer members 134 are woven through the warp at spaced-apart intervals ranging from about 3 to about 30 times the maximum cross-sectional dimension of the thermal members 132, with the actual spacing being dependent upon the rigidity of the thermal members 132 and the radius of curvature of the matrix. Interspersed between the spacer members 134 are means for maintaining the thermal members 132 in parallel relation during assembly. Referring again to FIG. 8, the relation-maintaining means may consist of a plurality of threads 138 woven through the thermal members 132. Alternatively, the relation-maintaining means may consist of a polymeric mass 140. The relation-maintaining means 140 may be a polymeric tape applied to both sides of the thermal members 132, or it may be formed by applying a molten polymer across the thermal members and allowing the polymer to solidify.

The relation-maintaining means is made of a natural or synthetic material which is dimensionally stable at least about 20° to 40° C., and which can be removed by the action of heat, vacuum or by a solvent, or any combination thereof. Suitable materials include cotton thread, acrylic fiber, a low-melting point hot-melt glue, polyethylene, rayon thread, and the like.

Figure 12:
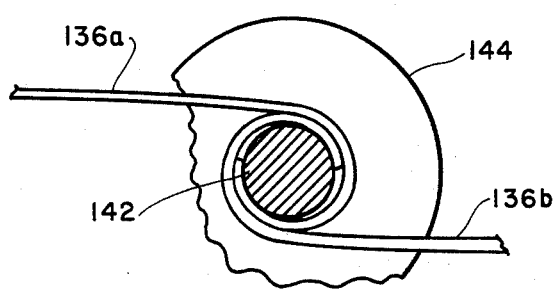
FIG. 12 illustrates in side view how a woven material is wound up.

Referring to FIG. 12, the heat-storage-mass 128 is fabricated by winding the woven structure 136 onto a cylindrical mandrel 142 positioned for rotation on a winding apparatus 144. In winding the structures shown in FIGS. 2-5, two equal lengths of the composite structure 136 are concurrently wound onto the mandrel 142. For the purpose of illustration one of these structures is designated 136a while the other is designated 136b in FIG. 12. The starting ends of the composite structures 132a and 132b are positioned at diamtrically opposed locations on the mandrel 142, with the position of the composite 132b shifted axially relative to the composite 132a, along the rotational axis of mandrel 142, by approximately one-half the pitch (i.e., center-to-center distance) of the thermal members. Winding the composite structures onto the mandrel in this manner allows, for example, positioning of the thermal members of the composite structure 132b of one spiral layer of the wound mass into the valleys between adjacent thermal members of the alternating spiral layer of the composite structure 132a.

In a presently preferred embodiment, the surface of mandrel 142 is shaped complementary to the pairs of diametrically offset spirals so that there is no apparent discontinuity in the winding surface.

Alternatively, the structures shown in FIGS. 2-5 can be fabricated by winding a single composite 132 onto the mandrel at a helix angle of about $\tan^{-1} d/C$ wherein d is the center-to-center distance of the thermal members 132 in the composite, and C is the circumference of the mandrel 142. Winding the composite structure 136 at this helix angle allows positioning of the thermal members 132 of each newly wound layer in the valleys between adjacent thermal members of each preceding layer.

After the heat-storage-mass 128 is wound to a desired diameter, the end of the woven structure is secured to the wound mass in a suitable manner to prevent unwinding of the mass. The wound heat-storage mass is removed from the mandrel and disposed in the regenerator housing. Alternatively, the cylindrical core 114 of the regenerator 110 may be employed as the winding mandrel.

Assembly of the regenerator 110 is completed by installing the mass support 130, the ends 120 and 122, and the like. The relation-maintaining means are then removed. Low-melting polymeric materials can be removed by applying a reduced pressure to one of the conduits 124 or 126 and passing a heated gas into the other of the conduits. Alternatively, a material such as rayon or other polymer can be removed by passing a solvent such as acetone through the regenerator.

Referring again to FIG. 2, it can be seen that following removal of the relation-maintaining means 138 or 140, the thermal members 132 are maintained in spaced apart relation by the spacer members 134. As noted previously, only one such spacer member 134 is illustrated in FIG. 2. That is because, if evenly spaced apart in the composite structure 136, the members 134 will appear at different angular locations in the heat-storage mass when the composite 136 is wound spirally about the mandrel. Any small cross-section, such as FIG. 2 will, in all likelihood, exhibit only one such spacer member 134, even though a plurality of such spacer members are present in the heat-storage mass 128. For illustrative purposes, the embodiment shown in FIG. 4 illustrates two of the spacer members 134.

The heat-storage-mass structures shown in FIGS. 6 and 7 are fabricated using two different size woven structures. Referring to FIG. 6, the first woven structure comprises a plurality of relatively large thermal members 146, a plurality of spacer members 148 and a plurality of relation-maintaining members, as described previously. The second woven structure comprises a plurality of relatively small thermal members 150, a plurality of spacer members 152, and a plurality of relation-maintaining members, as described previously. The structure shown in FIG. 6 is fabricated by simultaneously winding the first and the second woven structures onto a cylindrical mandrel, as described previously. The resulting structure is assembled into a regenerator as described previously. The structure shown in FIG. 7 is fabricated in a similar manner. In general, the relative sizes of the thermal members will be about 1.5:1 to 3:1, 'based upon the maximum cross-sectional dimension of the larger thermal member.

Thermal regenerators fabricated in accordance with this invention can range in size from about that of a sewing thimble or smaller, to about room size, or larger, and are suitable for operating temperatures ranging from 3°–4° K. to about 1500° K.

Various modifications may be made in the present invention without departing from the spirit thereof or the scope of the appended claims.

I claim:

1. A process for fabricating a thermal regenerator which comprises the steps of:
   (a) providing a first composite woven structure consisting of a plurality of parallel, longitudinally oriented, spaced apart thermal members for storage and transfer of heat, a plurality of parallel, transversely oriented, spaced apart heat-resisting cords woven through said thermal members, and means for maintaining said thermal members in said parallel relation;
   (b) winding said composite structure spirally around a cylindrical mandrel, thereby providing a wound structure;
   (c) disposing the resulting wound structure in a regenerator housing, said housing comprising an outer wall, a central cylindrical core having closed ends, a first end closure means, a second end closure means, a first fluid transfer means in operable communication with said first end closure means, and a second fluid transfer means in operable communication with said second end closure means, whereby a fluid may be transferred from one of said fluid transfer means through said wound structure disposed in said housing to the other of said fluid transfer means;
   and,
   (d) removing said maintaining means.

2. The process of claim 1 wherein said maintaining means is a polymeric material and wherein said removing step (d) consists essentially of applying a reduced pressure to one of said fluid transfer means and passing a heated gas into the other of said fluid transfer means.

3. The process of claim 1 further comprising providing a second composite woven structure substantially identical to said first structure, and winding said first and said second composite structures concurrently onto said mandrel, wherein the ends of said first and second composites are positioned diametrically opposite on said mandrel and wherein said second composite is positioned axially relative to said first composite approximately one-half the pitch of said thermal members.

4. The process of claim 1 wherein said composite structure is wound in helical fashion.

5. The process of claim 1 further comprising providing a second composite woven structure wherein the said thermal members are smaller than the said thermal members in said first composite woven structure, and wherein said winding step (b) consists of simultaneously winding said first and second woven structures onto said mandrel.

* * * * *